UNITED STATES PATENT OFFICE.

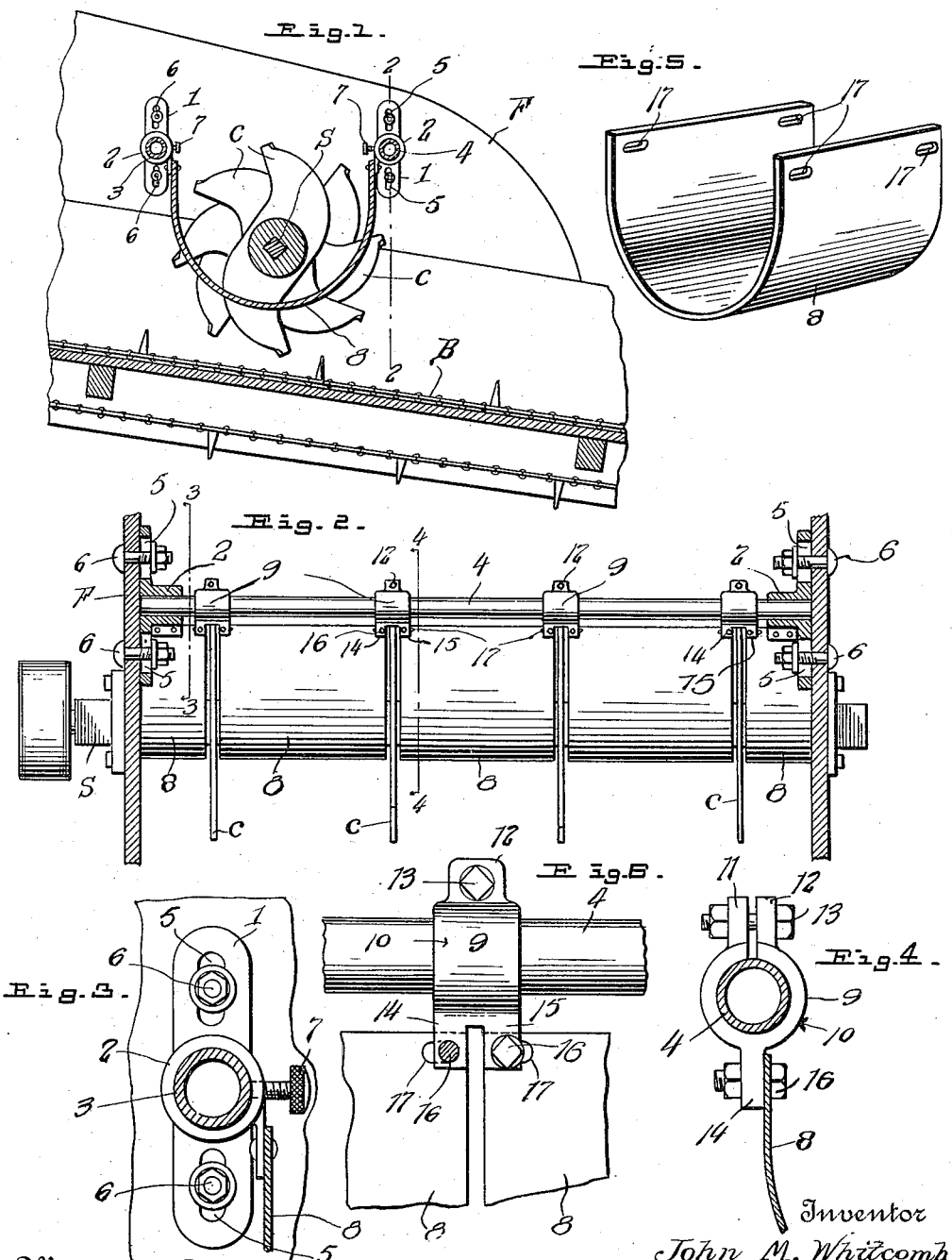

JOHN M. WHITCOMB, OF REDWOOD FALLS, MINNESOTA.

BAND-CUTTER GUARD.

1,158,759.  Specification of Letters Patent. Patented Nov. 2, 1915.

Application filed April 1, 1915. Serial No. 18,500.

*To all whom it may concern:*

Be it known that I, JOHN M. WHITCOMB, a citizen of the United States, residing at Redwood Falls, in the county of Redwood and State of Minnesota, have invented certain new and useful Improvements in Band-Cutter Guards; and I do declare the following to be a full, clear, and exact description of the invention, such as will enable others skilled in the art to which it appertains to make and use the same.

This invention relates to feeding mechanism for threshing machines and more particularly to band cutter guards for automatic feeders of grain threshing separators.

The object of the invention is to provide a band cutter guard which may be adjusted both laterally and vertically relatively to the knives to adapt it for use on various kinds of grains in various conditions and to adapt it for use as a cleaner for the knives.

With this and other objects in view, the invention consists of certain novel features of construction, and the combination and arrangement of parts as will be hereinafter more fully described and claimed.

In the accompanying drawings: Figure 1 represents a vertical section through a portion of an automatic feeder showing the application of this improved guard; Fig. 2 is a transverse vertical section taken on the line 2—2 of Fig. 1; Fig. 3 is an enlarged detail vertical section taken on the line 3—3 of Fig. 2; Fig. 4 is a similar view taken on the line 4—4 of Fig. 2; Fig. 5 is a detail perspective view of one of the guards detached; Fig. 6 is an enlarged detail showing the connection of the guards to one of their supporting bars.

In the embodiment illustrated I have shown a portion of an automatic feeder F having the usual conveying belt B for conveying the bundles beneath the rotating shaft S on which are mounted a plurality of cutting blades C.

The blades or cutters C are mounted on the shaft S in any suitable manner, said shaft being here shown angular in cross sectional contour and the blades are provided with correspondingly shaped apertures to hold them against turning on the shaft. Supported on the side members of the feeder F in planes above the shaft S and disposed on opposite sides thereof are bearing plates 1 herein shown oblong in form with shaft receiving bearings 2 extending laterally from their inner faces at points midway their ends. Four of these plates 1 are employed, two being mounted on each side member of the feeder frame and in horizontal alinement to adapt them to support the guard carrying shafts 3 and 4, the ends of which are carried by the bearings 2 of said plates 1. Each plate is provided on opposite sides of the bearing 2 with longitudinally extending slots 5 through which securing bolts 6 pass for connecting the plates in adjusted position on the frame of the feeder F. These shafts 3 and 4 may be secured in the bearings 2 in any suitable manner, set screws 7 being herein shown for this purpose.

Guards 8 are shown interposed between the knives C and are herein shown formed of sheet metal plates substantially semicircular in cross section and of a width slightly less than the distance between the knives or blades C as is shown clearly in Fig. 2. These guards 8 pass under the cutter shaft S and are connected at their opposite ends with the supporting shafts 3 and 4 by means of peculiarly constructed clamps 9 shown mounted for longitudinal adjustment on the shafts 3 and 4 each of which is connected on opposite sides of one of the blades C with the upper corners of adjacent guards 8. These clamps 9 are shown specifically in Figs. 4 and 6 and each comprises a shaft encircling longitudinally split band 10 provided at its split edges with laterally extending apertured lugs 11 and 12 to receive clamping bolts 13 for adjustably mounting said clamps on the shaft to which they are to be applied. Extending laterally from this band 10 preferably at a point diametrically opposite the lugs 11 and 12 are two longitudinally spaced apertured lugs 14 and 15 spaced apart a sufficient distance to permit the free passage between them of a blade C as is shown clearly in Fig. 2. Connected to each of these lugs 14 and 15 is one corner of a guard 8 which is secured thereto by placing it in overlapping relation relative to the lug to which it is to be connected and passing a clamping bolt 16 therethrough. These guards are provided with slots 17 extending in a plane parallel with the shaft on which the clamp carrying said guards is mounted to provide for the adjustment of the guard connected with this lug so that said guards may be adjusted toward or away from the respective knives, it being desirable to position them in close contact with the knives when it is desired that the guards shall operate as cleaners for the knives.

It is especially desirable to have these guards vertically adjustable or adjustable toward and away from the cutter shaft S which they are designed to protect in order that grain may be passed under this attachment in varying conditions, for instance when the grain is wet and in bad condition the guards are lowered to hold the wet grain down adjacent the ends of the knives C while said knives are rising and consequently all possibility of the straw rising and wrapping around the shaft S is prevented and all possibility of backlashing is also prevented. When the cutter is to be used on loose grain the guards 8 are preferably raised by elevating one or both of the shafts 3 or 4 with which the opposite ends of said guards are connected.

I claim as my invention:

1. The combination with a supporting frame, a cutter shaft mounted thereon, knives on said shaft, parallel guard supporting shafts carried by the frame arranged on opposite sides of said cutter shaft, and curved guards extending under said supporting shafts and provided with means for separate longitudinal adjustment with respect to the cutter shaft.

2. The combination with a supporting frame, a cutter shaft mounted thereon, knives on said shaft, guard supporting shafts arranged on either side of the same in parallel relation therewith and in planes above the plane of the cutter shaft, vertically adjustable bearings for said guard supporting shafts on the frame, guards interposed between said knives, clamps longitudinally spaced on said supporting shafts engaging the opposite ends of the guards, each clamp having a shaft receiving opening intermediate its ends and a longitudinally slotted upper end forming two apertured lugs held together by clamping bolts therethrough, the lower ends of said clamps being bifurcated and apertured, said guards having slotted corners for overlapping engagement with the said bifurcated lower ends of the clamp, connecting elements passing through said last mentioned parts, and said clamps positioned on the guard supporting shafts with their bifurcated lower ends spanning the cutter blades.

In testimony whereof I have hereunto set my hand in presence of two subscribing witnesses.

JOHN M. WHITCOMB.

Witnesses:
H. A. BALDWIN,
FRED W. ZANDER.

Copies of this patent may be obtained for five cents each, by addressing the "Commissioner of Patents, Washington, D. C."